United States Patent
Sawabe et al.

(10) Patent No.: US 7,239,585 B2
(45) Date of Patent: Jul. 3, 2007

(54) INFORMATION RECORDING APPARATUS AND METHOD, INFORMATION REPRODUCING APPARATUS AND METHOD, INFORMATION RECORDING PROGRAM AND INFORMATION REPRODUCING PROGRAM, RECORDING MEDIUM AND INFORMATION RECORDING MEDIUM

(75) Inventors: Takao Sawabe, Tokorozawa (JP); Masanori Nakahara, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 734 days.

(21) Appl. No.: 10/339,664

(22) Filed: Jan. 10, 2003

(65) Prior Publication Data

US 2003/0212564 A1 Nov. 13, 2003

(30) Foreign Application Priority Data

Jan. 11, 2002 (JP) ............................ P2002-005349

(51) Int. Cl.
*G11B 7/00* (2006.01)
(52) U.S. Cl. ............................... 369/47.13; 369/59.25; 369/47.22; 369/47.12
(58) Field of Classification Search ...................... None
See application file for complete search history.

(56) References Cited

U.S. PATENT DOCUMENTS 6,515,212 B2 * 2/2003 Taira et al. .................. 709/247

2003/0016463 A1 1/2003 Nakahara et al. ............. 360/55

FOREIGN PATENT DOCUMENTS

| JP | 2001-357001 A | 12/2001 |
|----|---------------|---------|
| JP | 2002-184114 A | 6/2002  |
| JP | 2002-352510 A | 12/2002 |
| JP | 2003-022605 A | 1/2003  |
| JP | 2003-029796 A | 1/2003  |

* cited by examiner

*Primary Examiner*—Andrea Wellington
*Assistant Examiner*—Jorge L. Ortiz-Criado
(74) *Attorney, Agent, or Firm*—Drinker Biddle & Reath LLP

(57) ABSTRACT

An information recording apparatus encodes distributed information, which is inputted via a network, in an encoding scheme for allowing decode by a plurality of types of players to obtain encoded distributed information, and when the distributed information is distributed including reproduction control information, the apparatus generates applicable reproduction control information for controlling reproduction aspects on actual reproduction based on the reproduction control information so as to record the applicable reproduction control information and encoded distributed information on an optical disk DK. Furthermore, when the distributed information is recorded, the apparatus records attribute information indicating that together with the encoded distributed information.

13 Claims, 10 Drawing Sheets

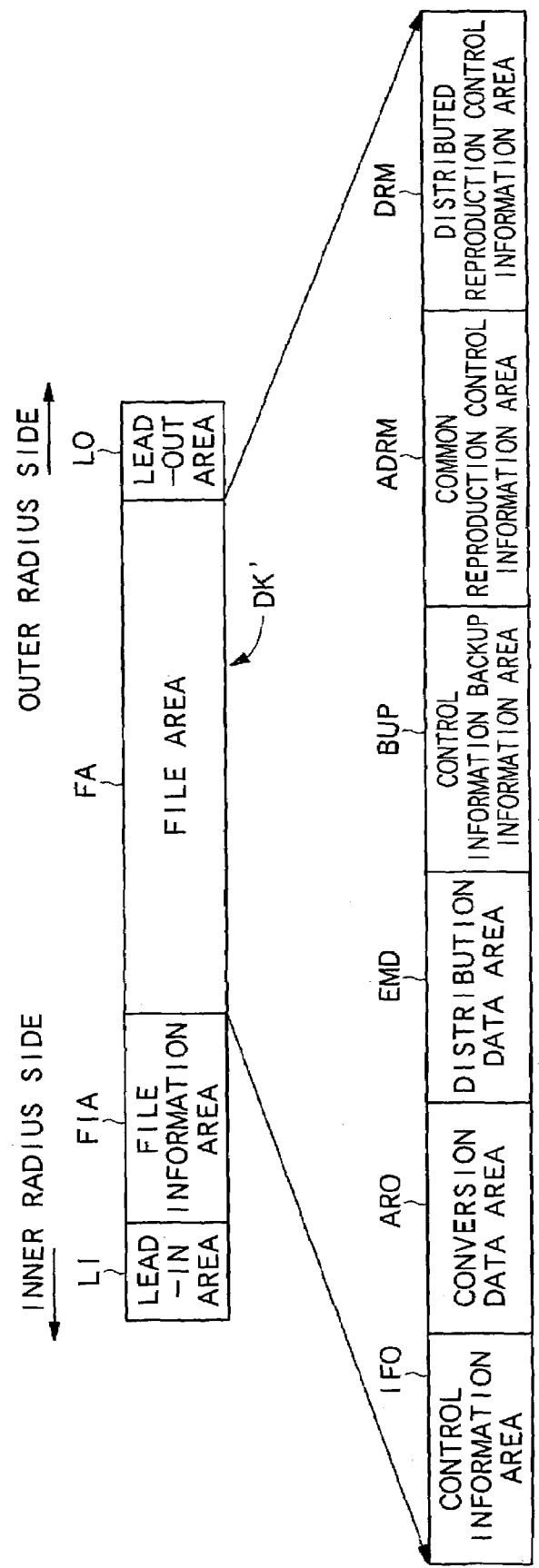

INFORMATION RECORDING APPARATUS AND METHOD, INFORMATION REPRODUCING APPARATUS AND METHOD, INFORMATION RECORDING PROGRAM AND INFORMATION REPRODUCING PROGRAM, RECORDING MEDIUM AND INFORMATION RECORDING MEDIUM

BACKGROUND OF THE INVENTION

1. Field of the Invention

The present invention relates to a technological field of an information recording apparatus and a method thereof, an information reproducing apparatus and a method thereof, an information recording program and an information reproducing program, a recording medium and an information recording medium, and in particular, to the technological field of the information recording apparatus and method thereof, the information reproducing apparatus and method thereof, the information recording program and information reproducing program for reproducing record information distributed via a network while protecting copyright thereon, the information recording medium having each of the programs recorded thereon and the recording medium having the distributed record information recorded thereon.

2. Description of the Related Art

In recent years, research and development has been underway on recording formats for recording audio information including music information and voice information on recording mediums such as a DVD (Digital Versatile Disc).

On the other hand, so-called music distribution (commonly referred to as EMD: Electronics Music Distribution) is being started recently for distributing the above audio information via a network such as the Internet to personal computers for individual use, for example. Thus, it is desirable that the above recording format currently under development also conforms to this music distribution method.

Now, in the current music distribution there are several distribution methods (that is compression techniques used in the distribution) incompatible with each other such as the AC-3 (Audio Compression-3) method or the MP3 (MPEG (Moving Picture Expert Group) 1 Audio Layer 3) method.

As for the information recording apparatus (to be more specific, a DVD recorder for instance) used to record the music information and so on distributed as above on a DVD or the like, it is seldom used only for that purpose. In reality, it is usually constituted to be also used to record on the DVD the music information and so on reproduced by a DVD player, for instance, directly connected to the information recording apparatus other than the distributed music information.

On the other hand, the music information distributed by music distribution is generally protected by copyright law, and so the distributed music information must be effectively protected from being freely copied without permission of a copyright holder thereof. To review the information recording apparatus from this viewpoint, it is possible to perform so-called dubbing of the music information and so on from the DVD player or the like in the case where the music information and so on are not protected by copyright law. Therefore, it is necessary, in this case, that the distributed (copyright-law-protected) music information and so on and other music information and so on should be clearly distinguished on the DVD or the like having them mixedly recorded thereon and then the distributed music information and so on should be effectively protected by the copyright law.

However, in the case of the above-mentioned music distribution methods in the past, if the music information distributed by each of the methods is to be recorded as-is on the recording medium such as the DVD, there exist on one recording medium a mixture of several types of music information compressed by different compression techniques. Consequently, in the cases of reproducing the music information recorded on the recording medium, one information reproducing apparatus must conform to the types of compression technique.

Therefore, in this case, there were a problem of unsecured "compatibility in reproduction process", and a problem that attempting to conform the compression techniques with each other in the information reproducing apparatus increases manufacturing costs extremely.

This problem leads to another problem that the increased manufacturing costs of the information reproducing apparatus lead to the soaring of the total manufacturing costs of the information recording/reproducing system including the information reproducing apparatus and an information recording apparatus for recording the music information on the recording medium, thereby preventing the information recording/reproducing system from being widely used.

From the viewpoint of the copyright law, the method of music distribution in the past had a problem that no thought was given to distinguishing the music information and so on distributed and recorded on the DVD or the like according to this method from any other music information, and furthermore, little thought was given to protection by the copyright law by controlling the reproduction aspects in the case of reproducing the distributed music information and so on after the distribution, and consequently the distributed music information and so on were not sufficiently protected by the copyright law.

SUMMARY OF THE INVENTION

Thus, the present invention has been implemented in consideration of the above problems, and its object is to provide the information recording apparatus and method thereof, the information reproducing apparatus and method thereof, the information recording program and information reproducing program capable of recording the music information and so on the recording medium in such a way as to reduce the costs of the information reproducing apparatus and consequently reduce the costs of the information recording and reproducing system so as to promote diffusion thereof and also capable of clearly distinguishing the distributed music information and so on from other music information and so on and reproducing them in an aspect sufficiently protecting them by the copyright law, and the information recording medium having each of the programs recorded thereon and the recording medium having the distributed record information recorded thereon.

The above object of the present invention can be achieved by an information recording apparatus of the present invention. The apparatus is provided with: an encoding device which encodes record information to be recorded on a recording medium in a specific encoding scheme for allowing decode by a plurality of types of information reproducing apparatuses to generate encoded record information; a generating device which, when the record information is distributed record information which is distributed from the outside and including reproduction control information for controlling reproduction aspects on reproducing encoded distributed record information obtained by encoding the distributed record information by the encoding device, generates applicable reproduction control information for controlling the reproduction aspects on actually reproducing the encoded distributed record information after recording it on the recording medium, based on the reproduction control information which is distributed; a first recording device which records on the recording medium the applicable reproduction control information which is generated and the encoded distributed record information which is encoded; and a second recording device which, when the record information is the distributed record information, records on the recording medium identification information indicating that the encoded distributed record information recorded on the recording medium is the encoded distributed record information obtained by encoding the distributed record information.

According to the present invention, as the record information including the distributed record information is encoded by a specific encoding method, it can be recorded in a state capable of decoding and reproduction by a plurality of types of information reproducing apparatuses so that the compatibility in the reproduction process can be secured.

Therefore, it is possible to reduce the costs of the information reproducing apparatus by cutting the costs arising when applying it as the information reproducing apparatus to a plurality of types of encoding methods and consequently reduce the costs of the information recording/reproducing system including the information reproducing apparatus and the information recording apparatus of the present invention so as to promote diffusion thereof.

The identification information and applicable reproduction control information are recorded together with the encoded distributed record information. Therefore, when it is indicated by the identification information that the encoded distributed record information is recorded, the encoded distributed record information is reproduced by detecting and using corresponding applicable reproduction control information so that it is possible to clearly distinguish the encoded distributed record information from other encoded record information and then reproduce the corresponding encoded distributed record information while performing reproduction control based on the detected applicable reproduction control information.

In one aspect of the present invention, the apparatus is further provided with a third recording device which records on the recording medium the distributed record information in the as-is encoding scheme on the distribution.

According to this aspect, not only the encoded distributed record information but also the original distributed record information is recorded as-is in the encoding scheme on the distribution, and so the distributed record information can be moved as-is in the original encoding scheme when moving it to the outside.

In another aspect of the present invention, the generating device generates as the applicable reproduction control information common reproduction control information for controlling in common each of the reproduction aspects in the encoded distributed record information obtained by encoding different kinds of the distributed record information by the encoding device respectively, based on each piece of the reproduction control information, and the first recording device records on the recording medium the common reproduction control information which is generated together with the encoded distributed record information which is encoded.

According to this aspect, the common reproduction control information is recorded together with the encoded distributed record information so that, by using the common reproduction control information when reproducing the encoded distributed record information, it is possible, even in the case of the encoded distributed record information obtained from different kinds of distributed record information corresponding to different pieces of reproduction control information respectively, to reproduce the distributed record information without having a special configuration to correspond to each piece of reproduction control information so as to further improve the compatibility as the information reproducing apparatus.

In further aspect of the present invention, the generating device renders as the applicable reproduction control information each piece of the reproduction control information itself in addition to the common reproduction control information, and the first recording device records on the recording medium the common reproduction control information and each piece of the reproduction control information which are generated together with the encoded distributed record information which is encoded.

According to this aspect, not only the common reproduction control information but also the reproduction control information is recorded together so that, it is possible, when moving the distributed record information to the outside, to move the reproduction control information corresponding to the distributed record information in the as-is aspect on the distribution together with the distributed record information.

The above object of the present invention can be achieved by an information reproducing apparatus of the present invention for reproducing at least an encoded distributed record information from a recording medium, the recording medium comprising:

an encoded record information recording area in which encoded record information is recorded, the encoded record information generated by encoding record information to be recorded on a recording medium in a specific encoding scheme for allowing decode by a plurality of types of information reproducing apparatuses;

a distributed control information recording area in which applicable reproduction control information is recorded, the applicable reproduction control information being generated, when the record information is distributed record information which is distributed from the outside and including reproduction control information for controlling reproduction aspects on reproducing encoded distributed record information obtained by encoding the distributed record information in the specific encoding scheme, based on the reproduction control information which is distributed, the applicable reproduction control information being used for controlling the reproduction aspects on actually reproducing the encoded distributed record information after recording it on the recording medium; and an identification information recording area in which identification information is recorded, the identification information indicating that the encoded distributed record information recorded on the recording medium is the encoded distributed record information obtained by encoding the distributed record information.

The information reproducing apparatus is provided with: a first detection device which detects the identification information from the recording medium; a determination device which determines whether or not the encoded record information to be reproduced is the encoded distributed record information based on the detected identification information; a second detection device which detects the applicable reproduction control information from the recording medium when the encoded record information to be reproduced is the encoded distributed record information; and a reproduction device which reproduces the encoded distributed record information from the recording medium while controlling the reproduction aspects based on the applicable reproduction control information which is detected.

According to the present invention, the record information including the distributed record information is encoded in a specific encoding scheme decodable and reproducible by a plurality of types of information reproducing apparatuses so that it is possible to reproduce the distributed record information without having a special configuration as the information reproducing apparatus and secure the compatibility in the reproduction process.

Therefore, it is possible to reduce the costs of the information reproducing apparatus by cutting the costs arising when applying it as the information reproducing apparatus to a plurality of types of encoding methods and consequently reduce the costs of the information recording/reproducing system including the information reproducing apparatus and the information recording apparatus of the present invention so as to promote diffusion thereof.

When it is indicated by the identification information that the encoded distributed record information is recorded, the corresponding applicable reproduction control information is detected and used for reproduction control so that it is possible to clearly distinguish the encoded distributed record information from other encoded record information and then perform actual reproduction process of the encoded distributed record information in the reproduction aspects determined on the distribution.

In one aspect of the present invention, the recording medium comprises a distributed record information recording area in which distributed record information, which is distributed and the including reproduction control information, is recorded in the as-is encoding scheme on the distribution. In addition, the information reproducing apparatus is further provided with: a detection device which, when moving the distributed record information which is recorded to the outside, detecting from the recording medium the distributed record information to be moved; an output device which outputs the distributed record information which is detected to the outside; and a deletion device which deletes on the recording medium the distributed record information remaining on the recording medium after the output to the outside and the encoded distributed record information corresponding thereto.

According to this aspect, it outputs and moves the distributed record information in a distributed state to the outside so that it can move the distributed record information recorded in conformance to the specifications which the distributed record information should conform to.

In addition, it deletes the distributed record information and the corresponding encoded distributed record information on the recording medium after outputting the distributed record information to the outside so that, even if an attempt is made to illegally detect on the recording medium the distributed record information outputted to the outside by a subsequent operation, the illegal operation can be rendered infeasible.

In another aspect of the present invention, in the distributed control information recording area, common reproduction control information is recorded as applicable reproduction control information, the common reproduction control information being used for controlling in common each of the reproduction aspects in the encoded distributed record information obtained by encoding different kinds of the distributed record information; and in the distributed control information recording area, each piece of the reproduction control information itself is recorded in addition to the common reproduction control information. The information reproducing apparatus is further provided with: a detection device which, when moving the distributed record information which is recorded to the outside, detects from the recording medium the distributed record information to be moved and the reproduction control information corresponding to the distributed record information to be moved; an output device which outputs the distributed record information and the reproduction control information which are detected to the outside; and a deletion device which deletes the distributed record information and the reproduction control information remaining on the recording medium after the output to the outside.

According to this aspect, it outputs and moves the distributed record information in the distributed state and the reproduction control information to the outside so that it can move the distributed record information recorded in conformance to the specifications which the distributed record information should conform to while keeping the reproduction aspects determined on the distribution of the distributed record information.

In addition, it deletes the distributed record information and the reproduction control information on the recording medium after outputting them to the outside so that, even if the attempt is made to illegally detect on the recording medium the distributed record information outputted to the outside by the subsequent operation, the illegal operation can be rendered infeasible.

The above object of the present invention can be achieved by an information recording method of the present invention. The method is provided with: an encoding process of encoding record information to be recorded on a recording medium in a specific encoding scheme for allowing decode by a plurality of types of information reproducing apparatuses to generate encoded record information; a generating process of, when the record information is distributed record information which is distributed from the outside and including reproduction control information for controlling reproduction aspects on reproducing encoded distributed record information obtained by encoding the distributed record information by the encoding device, generates applicable reproduction control information for controlling the reproduction aspects on actually reproducing the encoded distributed record information after recording it on the recording medium based on the reproduction control information which is distributed; a first recording process of recording on the recording medium the applicable reproduction control information which is generated and the encoded distributed record information which is encoded; and a second recording process of, when the record information is the distributed record information, recording on the recording medium identification information indicating that the encoded distributed record information recorded on the recording medium is the encoded distributed record information obtained by encoding the distributed record information.

According to the present invention, as the record information including the distributed record information is encoded by a specific encoding method, it can be recorded in a state capable of decoding and reproduction by a plurality of types of information reproducing apparatuses so that the compatibility in the reproduction process can be secured.

Therefore, it is possible to reduce the costs of the information reproducing apparatus by cutting the costs arising when applying it as the information reproducing apparatus to a plurality of types of encoding methods and consequently reduce the costs of the information recording/reproducing system including the information reproducing apparatus and the information recording apparatus of the present invention so as to promote diffusion thereof.

The identification information and applicable reproduction control information are recorded together with the encoded distributed record information. Therefore, when it is indicated by the identification information that the encoded distributed record information is recorded, the encoded distributed record information is reproduced by detecting and using corresponding applicable reproduction control information so that it is possible to clearly distinguish the encoded distributed record information from other encoded record information and then reproduce the corresponding encoded distributed record information while performing reproduction control based on the detected applicable reproduction control information.

The above object of the present invention can be achieved by an information reproducing method of the present invention for reproducing at least an encoded distributed record information from a recording medium, the recording medium comprising:

an encoded record information recording area in which encoded record information is recorded, the encoded record information generated by encoding record information to be recorded on a recording medium in a specific encoding scheme for allowing decode by a plurality of types of information reproducing apparatuses;

a distributed control information recording area in which applicable reproduction control information is recorded, the applicable reproduction control information being generated, when the record information is distributed record information which is distributed from the outside and including reproduction control information for controlling reproduction aspects on reproducing encoded distributed record information obtained by encoding the distributed record information in the specific encoding scheme, based on the reproduction control information which is distributed, the applicable reproduction control information being used for controlling the reproduction aspects on actually reproducing the encoded distributed record information after recording it on the recording medium; and an identification information recording area in which identification information is recorded, the identification information indicating that the encoded distributed record information recorded on the recording medium is the encoded distributed record information obtained by encoding the distributed record information.

The information reproducing method is provided with: a first detection process of detecting the identification information from the recording medium; a determination process of determining whether or not the encoded record information to be reproduced is the encoded distributed record information based on the detected identification information; a second detection process of detecting the applicable reproduction control information from the recording medium when the encoded record information to be reproduced is the encoded distributed record information; and a reproduction process of reproducing the encoded distributed record information from the recording medium while controlling the reproduction aspects based on the applicable reproduction control information which is detected.

According to the present invention, the record information including the distributed record information is encoded in a specific encoding scheme decodable and reproducible by a plurality of types of information reproducing apparatuses so that it is possible to reproduce the distributed record information without having a special configuration as the information reproducing apparatus and secure the compatibility in the reproduction process.

When it is indicated by the identification information that the encoded distributed record information is recorded, the corresponding applicable reproduction control information is detected and used for reproduction control so that it is possible to clearly distinguish the encoded distributed record information from other encoded record information and then perform actual reproduction process of the encoded distributed record information in the reproduction aspects determined on the distribution.

BRIEF DESCRIPTION OF THE DRAWINGS

FIG. 10 is a diagram showing a physical format on an optical disk in a second embodiment.

DETAILED DESCRIPTION OF THE PREFERRED EMBODIMENTS

Figure 1:
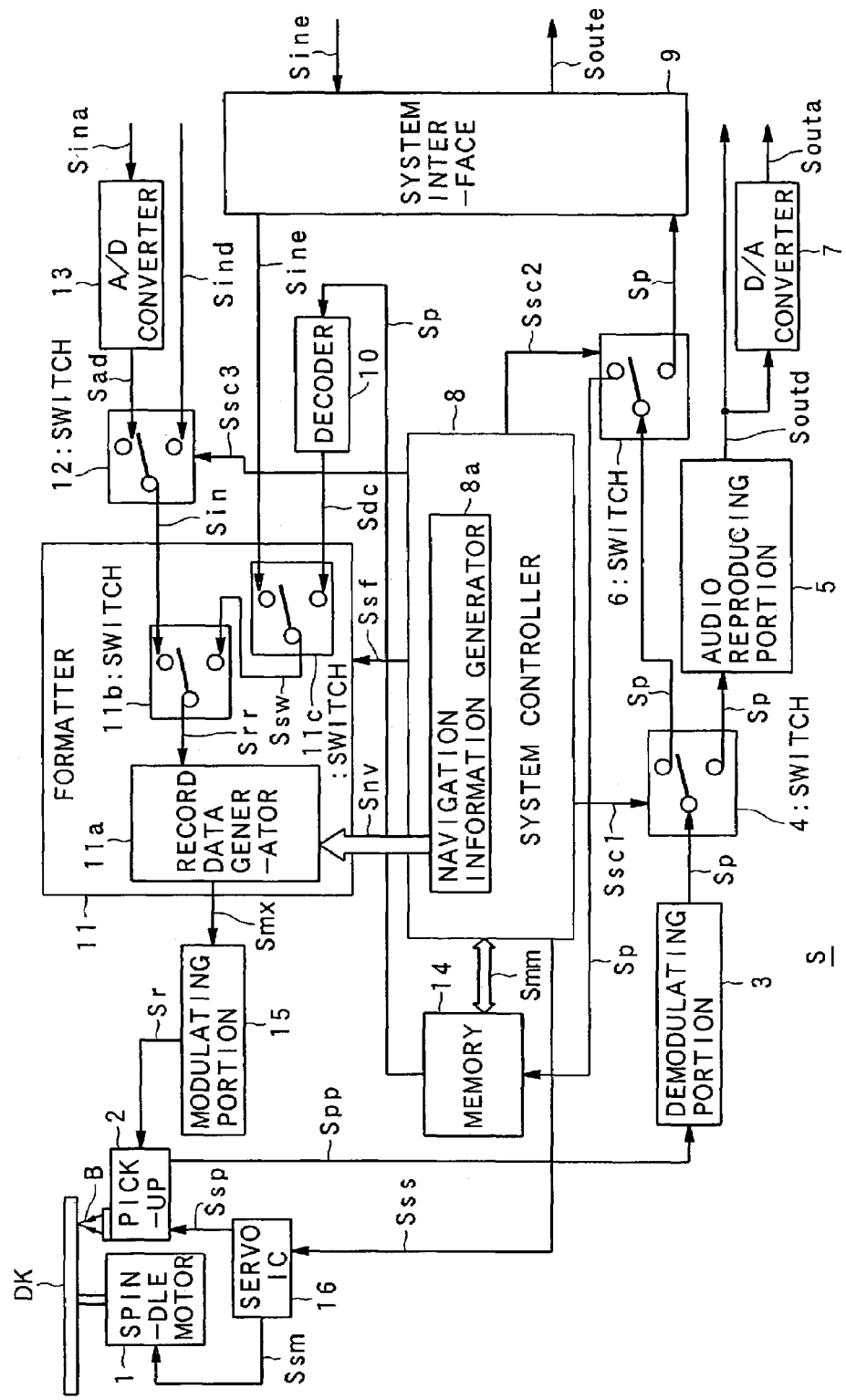
FIG. 1 is a block diagram showing an overview configuration of an information recording apparatus related to embodiments.

Next, preferred embodiments of the present invention will be described based on the drawings.

The embodiments described below are the embodiments in the case of applying the present invention to an information recording and reproducing apparatus for recording music information distributed by the EMD on an optical disk as a recording medium capable of recording it and reproducing the recorded music information in conformance to the contents of reproduction control information mentioned later distributed simultaneously when the music information is distributed.

(I) SDMI Specifications

First, before describing specific embodiments, a brief description will be given as to the SDMI specifications which the information recording apparatus related to the embodiments conforms to and are currently being laid down in order to protect productions such as the music information from illegal copying and so on.

The SDMI specifications are currently being laid down as the specifications which the information recording apparatus for recording the productions on the recording medium should conform to in order to protect the productions including the music information from illegal copying and so on, and are currently being laid down centering on the music industry of the U.S.A. And at the present stage, the specifications reportedly include the prescriptions that, for instance, when normally distributing and recording the music information from a distribution source to a personal computer and so on by the EMD, only reproduction by the personal computer (hereafter, a primary receiving source) which is a distribution destination is permitted, and in addition, when moving the production (not a copy) from the above primary receiving source to another portable reproducing apparatus or the like (hereafter, a secondary receiving source), the number of times of reproduction at the secondary receiving source is limited, or the music information distributed by the EMD has copyright information embedded therein by so-called electronic watermark technology.

To concretely describe the copyright information to be embedded in the music information, it includes the information indicating a copyright holder in the case where the music information is a production and the reproduction control information indicating the contents of limitation of reproduction on reproducing the distributed music information. To be more specific, the reproduction control information includes as the copyright information the information on limitation of frequency of the reproduction on reproducing the music information, information on limitation of the period in which the reproduction is permitted, information on limitation of frequency of copying in the case of copying the reproduced music information on another recording medium (to be more specific, the information indicating whether the music information is copy free, no more copy or never copy) and identification information for identifying a distribution destination and a distribution source on distributing the music information by the EMD.

Here, according to the SDMI specifications, in the case where the music information is distributed by using the EMD, the music information to be distributed only exists on the primary receiving source having received it instead of being copied from the distribution source to the primary receiving source (that is, distributing the music information to the primary receiving source while having it remaining at the distribution source). And also in the case of moving the music information from the primary receiving source to the above secondary receiving source, the music information no longer exists on the primary receiving source on completion of the moving, but it only exists on the secondary receiving source which is the moving destination.

Furthermore, when it is no longer necessary to have the music information heard at the secondary receiving source, it is possible to return the music information to the original primary receiving source. At this time, the music information has disappeared from the secondary receiving source after the return.

Thus, according to the SDMI specifications, an attempt is made, about the music information itself, to securely protect the music information as the production by permitting only the moving rather than copying thereof.

Moreover, according to the above-mentioned SDMI specifications, distributing the music information from the primary receiving source to the secondary receiving source is called a check out, and returning it from the secondary receiving source to the primary receiving source is called a check in. To be more specific, the check out and check in are intended to prescribe a bi-directional moving method of a limited type performed without fail between a certain primary receiving source and a secondary receiving source, and in this case, it is of course possible to specify various types of reproducing apparatuses as the secondary receiving source. Furthermore, it is also possible to operate a moving destination frequency setting function for allowing bi-directional limited moving from the primary receiving source to a plurality of secondary receiving sources at the same time (in this case, the frequency is a parameter set by the distribution source).

Moreover, the SDMI specifications also prescribe a relatively simple moving method called "Move" for performing a move which is not mere copying in a single direction between the primary receiving source and the secondary receiving source and different from the moving method of the music information by the above check out and check in. In this case, however, there may be an instance where there is no compensation for return or storage of the music information to the primary receiving source. In addition, the music information at the moving source disappears as with the above check out and check in.

(II) First Embodiment

Next, a first embodiment related to the present invention will be described by using FIGS. 1 to 8.

To begin with, the configuration and overview operation of the information recording and reproducing apparatus related to the first embodiment conforming to the above SDMI specifications will be described by using FIG. 1.

FIG. 1 is a block diagram showing an overview configuration of the information recording and reproducing apparatus related to the first embodiment.

The information recording apparatus related to the first embodiments has a function of recording on the optical disk the information distributed from a distribution server by the above-mentioned EMD. In addition, this information recording apparatus also has a function of recording on the optical disk the music information inputted from the outside via an input terminal not shown and also outputting the recorded music information to an external apparatus such as a speaker via an output terminal not shown.

To be more specific, as shown in FIG. 1, an information recording apparatus S related to the first embodiments is comprised of a spindle motor 1, a pickup 2 as a first recording device, second recording device, third recording device, detecting device, first detecting device, second detecting device, a demodulating portion 3, switches 4, 6 and 12, an audio reproducing portion 5, a D/A (Digital/Analog) converter 7, a system controller 8 as a generating device, determining device, reproducing device, and deleting device, a system interface 9 as an outputting device, a decoder 10 as an encoding device, a formatter 11, an A/D (Analog/Digital) converter 13, a memory 14, a modulating portion 15 and a servo IC (Integrated Circuit) 16.

In addition, the formatter 11 is comprised of switches 11*b* and 11*c* and a record data generator 11*a*.

Furthermore, the system controller 8 includes a navigation information generator 8*a*.

Next, the operation will be described.

(A) Embodiment of Recording Operation from an External Sound Source

First, a description will be given as to the operation in the case of recording on an optical disk DK capable of recording the music information outputted from an external sound source (to be more specific, an optical disk player for instance) other than the distribution server of EMD.

Moreover, in this case, the switch 11b in the formatter 11 is switched to the switch 12 side based on a control signal Ssf from the system controller 8.

First, in the case where the music information inputted from the external sound source via the input terminal not shown is music information Sina which is an analog signal, the music information Sina is inputted to the A/D converter 13, and is digitized by the A/D converter 13 and then is outputted as digital music information Sad to one of the input terminals of the switch 12.

On the other hand, in the case where the music information from the external sound source is music information Sind which is originally a digital signal, the music information Sind is outputted as-is to the other input terminal of the switch 12.

And the switch 12 selects either the above digital music information Sad or music information Sind as the music information to be recorded on the optical disk DK based on a control signal Ssc3 from the system controller 8, and outputs it to one of the input terminals of the switch 11b as input music information Sin.

Thus, from the switch 11b switched to the switch 12 side, the input music information Sin is outputted as music information Srr to the record data generator 11a.

On the other hand, the navigation information generator 8a in the system controller 8 generates control information (it may be generally called navigation information), based on the contents of the above music information Sina or Sind inputted from the above external sound source, for controlling reproduction aspects (order of reproduction, music information to be reproduced, etc.) when reproducing either one of the music information after recording it on the optical disk DK so as to conform to the format mentioned later, and outputs it as control information Snv to the record data generator 11a.

To describe the above control information in detail here, it shows the reproduction aspects on reproducing the music information. To be more specific, it divides corresponding music information into pieces of partial information called programs, and further divides one program into information units called cells so as to control the reproduction aspects thereof. That is to say, the control information corresponding to one piece of music information includes the information describing the order of reproduction for each cell, regarding the cell included in the music information as a minimum unit. And the information describing the order of reproduction includes the information describing the address information indicating a recording position on the optical disk DK having each cell recorded in the order corresponding to the order of reproduction of the cells. In other words, the control information corresponding to one piece of music information includes logical information (may be called a logical format) describing the order of reproduction of the cells included as the physical format in each program in each piece of the music information.

Next, the record data generator 11a superposes the above music information Srr and control information Snv to conform to the format mentioned later, and outputs it as superposition information Smx to the modulating portion 15.

Thus, the modulating portion 15 generates a record signal Sr for recording superposition information Smx on the optical disk DK by modulating the intensity of a light beam B for recording radiated from the pickup 2 based on the superposition information Smx, and outputs it to an unshown semiconductor laser driving portion for driving an unshown semiconductor laser in the pickup 2.

Thereafter, the semiconductor laser driving portion radiates the light beam B by driving the semiconductor laser to modulate the intensity of the light beam B according to the contents of the record signal Sr. And the light beam B is radiated to an information recording face in the optical disk DK while the intensity thereof is modulated so that a recording pit changing its shape according to the contents of the record signal Sr is formed in the information recording face, and the music information Sina or Sind is thereby recorded on the optical disk DK.

In this case, the horizontal and vertical positions of the light beam B radiated to the information recording face are based on a control signal Ssp from a servo IC 16, and the vertical radiated position (that is, a condensed position of the light beam B) is controlled by driving of an unshown focus actuator in the pickup 2. On the other hand, the horizontal radiated position is controlled by driving of an unshown tracking actuator in the pickup 2.

Furthermore, the spindle motor 1 controls revolutions of the optical disk DK to have the preset number of revolutions based on a control signal Ssm from the servo IC 16.

For these purposes, the servo IC 16 generates and outputs the control signals Ssm and Ssp based on a control signal Sss from the system controller 8 respectively.

(B) Embodiment of Reproduction Output Operation to the Outside

Next, a description will be given as to the operation in the case of reproducing the music information recorded on the optical disk DK by the operation described in the above section (A) and outputting it to an external speaker and so on.

Moreover, in this case, the switch 4 is switched to the audio reproducing portion 5 side based on a control signal Ssc1 from the system controller 8.

First, on the reproduction process, the spindle motor 1 controls the revolutions of the optical disk DK to have the preset number of revolutions based on the control signal Ssm from the servo IC 16.

The light beam B of a fixed intensity for reproduction is radiated to the information recording face of the optical disk DK from the unshown semiconductor laser in the pickup 2. In this case, the vertical and horizontal positions of the light beam B radiated to the information recording face are controlled by driving of the unshown focus actuator and tracking actuator in the pickup 2 based on the control signal Ssp from the servo IC 16 as with recording of the information.

Furthermore, for these purposes, the servo IC 16 generates and outputs the above control signals Ssm and Ssp based on the control signal Sss from the system controller 8 respectively.

Moreover, as to the position on the optical disk DK from which the information is to be reproduced, the recording position of the music information to be reproduced on the optical disk DK is obtained based on the contents of the control information recorded together with the music information by the above-mentioned recording process, and based on this, the position on the optical disk DK at which the music information to be reproduced is recorded is identified.

Next, the light beam B radiated to the information recording face is modulated by the recording pit formed on the information recording face, and reflected light thereof is received by an unshown photo-detector in the pickup 2. And a detection signal Spp for changing according to variation of the intensity of the reflected light received by the photodetector is generated and outputted to the demodulating portion 3.

Thereafter, the demodulating portion 3 performs a preset demodulation process to the detection signal Spp and generates a demodulation signal Sp, and outputs it to the audio reproducing portion 5 via the switch 4 switched to the audio reproducing portion 5 side.

Thus, the audio reproducing portion 5 performs the preset reproduction process to the demodulation signal Sp to and generates a reproduction signal Soutd as a digital signal, and outputs it as-is to the external speaker and so on via an unshown digital output terminal and also outputs it to the D/A converter 7.

The D/A converter 7 renders the reproduction signal Soutd analog, and outputs it as an analog reproduction signal Souta to the external speaker and so on via an unshown analog output terminal.

(C) Embodiment of Music Information Recording Operation by the EMD

Next, a description will be given as to the music information recording operation related to the present invention for recording the music information distributed from the distribution server in the EMD.

Moreover, in this case, the switches 11b and 11c in the formatter 11 are switched to the switch 11c side and the system interface 9 side based on the control signal Ssf from the system controller 8. In addition, the switch 4 is switched to the switch 6 side based on the control signal Ssc1 from the system controller 8, and furthermore, the switch 6 is switched to the memory 14 side based on a control signal Ssc from the system controller 8.

First, music information Sine inputted together with the copyright information from the distribution server via an unshown input terminal has a preset interface process performed thereto by the system interface 9 and is outputted thereafter to one of the input terminals of the switch 11c.

The switch 11c switched to the system interface 9 side outputs the music information Sine as-is as the music information Ssw to the other input terminal of the switch 11b.

Thus, the switch 11b switched to the switch 11c side outputs the music information Ssw as-is as the music information Srr to the record data generator 11a.

The record data generator 11a performs no process to the music information Srr, and outputs it as the superposition information Smx to the modulating portion 15.

Thus, the modulating portion 15 generates a record signal Sr for recording the superposition information Smx on the optical disk DK by modulating the intensity of the light beam B for recording based on the superposition information Smx, and outputs it to the semiconductor laser driving portion in the pickup 2.

Thereafter, the semiconductor laser driving portion has the light beam B radiated by driving the semiconductor laser to modulate the intensity of the light beam B according to the contents of the record signal Sr. The light beam B is radiated to an information recording face in the optical disk DK while the intensity thereof is modulated so that the recording pit changing its shape according to the contents of the record signal Sr is formed in the information recording face, and the music information Sine is thereby recorded in the as-is form (as-is encoding method) as distribution data mentioned later on the optical disk DK.

In this case, the horizontal and vertical positions of the light beam B radiated to the information recording face are controlled by the driving of the focus actuator and tracking actuator in the pickup 2 as in the case of the above-mentioned "(A) Embodiment of recording operation from the external sound source".

Furthermore, the spindle motor 1 controls the revolutions of the optical disk DK to have the preset number of revolutions based on the control signal Ssm from the servo IC 16 as in the case of the above-mentioned "(A) Embodiment of recording operation from the external sound source".

For these purposes, the servo IC 16 generates and outputs the above control signals Ssm and Ssp based on the control signal Sss from the system controller 8 respectively.

If the music information Sine distributed from the distribution server by the above-mentioned series of recording processes is recorded as the distribution data in the as-is form together with the corresponding copyright information, etc., on the optical disk DK, the system controller 8 then outputs the above control signal Sss for controlling the radiated position of the light beam B to the servo IC 16 in order to reread the distribution data having the recording processes completed. Thus, the servo IC 16 controls the radiated position of the light beam B in order to reproduce the distribution data just recorded based on the control signal Sss. Moreover, in parallel with this process of the system controller 8, the switch 11c in the formatter 11 is switched to the decoder 10 side based on the control signal Ssf.

The pickup 2 receives the reflected light of the light beam B of which radiated position is controlled from the optical disk DK, and generates the above detection signal Spp corresponding to the contents of the recorded distribution data and outputs it to the demodulating portion 3.

Thus, the demodulating portion 3 performs a preset demodulation process to the detection signal Spp and generates a demodulation signal Sp, and temporarily accumulates it in the memory 14 via the switches 4 and 6 which are switched in the above-mentioned aspects.

On the other hand, the navigation information generator 8a reads as a memory signal Smm and analyzes the contents of the accumulated demodulation signal Sp. And based on the analyzed contents, the navigation information generator 8a records the music information in the demodulation signal Sp on the optical disk DK, and then, of the control information (navigation information) for controlling the reproduction aspects of the music information in the demodulation signal Sp after being recorded on the optical disk DK, it generates the information to be superposed on the music information and simultaneously recorded by conforming it to a format mentioned later, and outputs it as the control information Snv to the record data generator 11a.

On the other hand, the memory 14 reads the accumulated demodulation signal Sp in parallel with the generation process of the control information by the navigation information generator 8a, and outputs it to the decoder 10.

The decoder 10 decodes the demodulation signal Sp, and further converts a recording format of the music information included in the decoded demodulation signal Sp into the recording format of a recording format method decodable by a plurality of types of mutually different information reproducing apparatuses (to be more specific, the recording format of the so-called linear PCM (Pulse Code Modulation) method for instance), and outputs it as a conversion signal Sdc to the switch 11c switched to the decoder 10 side.

Next, the switch 11c outputs the conversion signal Sdc as the music information Ssw to the other input terminal of the switch 11b.

Thus, the switch 11*b* switched to the switch 11*c* side outputs the music information Ssw as-is as the music information Srr to the record data generator 11*a*.

Thus, the record data generator 11*a* superposes the mentioned music information Srr and the control information Snv to conform to the format mentioned later, and outputs it as the superposition information Smx to the modulating portion 15.

The modulating portion 15 generates a record signal Sr for recording the superposition information Smx on the optical disk DK by modulating the intensity of the light beam B for recording based on the superposition information Smx, and outputs it to the unshown semiconductor laser driving portion in the pickup 2.

Thereafter, the semiconductor laser driving portion has the light beam B radiated by driving the semiconductor laser to modulate the intensity of the light beam B according to the contents of the record signal Sr. The light beam B is radiated to an information recording face in the optical disk DK while the intensity thereof is modulated so that the recording pit changing its shape according to the contents of the record signal Sr is formed in the information recording face, and the music information of the contents having converted the format of the distribution data previously recorded is thereby recorded as conversion data mentioned later on the optical disk DK.

In this case, the horizontal and vertical positions of the light beam B radiated to the information recording face are controlled by the driving of the focus actuator and tracking actuator in the pickup 2 as in the case of the above-mentioned recording of the distribution data.

Moreover, of the conversion data and distribution data recorded on the optical disk DK by the above-mentioned series of operations, it is the music information recorded as the conversion data that is actually reproduced as the music information by the plurality of types of information reproducing apparatuses, and the distribution data is used when moving the music information to the secondary receiving source.

Next, a description will be given as to the operation in the case of moving the distribution data recorded on the optical disk DK by the above-mentioned series of operations to the secondary receiving source.

Moreover, in this case, the switch 4 is switched to the switch 6 side based on the control signal Ssc1 from the system controller 8, and furthermore, the switch 6 is switched to the system interface 9 side based on the control signal Ssc from the system controller 8.

In the case of performing the move process, first, the spindle motor 1 controls the revolutions of the optical disk DK to have the preset number of revolutions based on the control signal Ssm from the servo IC 16.

The light beam B of a fixed intensity for reproduction is radiated to the information recording face of the optical disk DK from the unshown semiconductor laser in the pickup 2. In this case, the vertical and horizontal positions of the light beam B radiated to the information recording face are controlled by driving of the unshown focus actuator and tracking actuator in the pickup 2 based on the control signal Ssp from the servo IC 16 as with recording of the information.

Moreover, as to the position on the optical disk DK from which the distribution data is to be reproduced, the recording position of the distribution data to be reproduced on the optical disk DK is obtained based on the contents of the control information recorded together with the music information by the above-mentioned recording process, and based on this, the position on the optical disk DK at which the distribution data to be reproduced is recorded is identified.

Next, the light beam B radiated to the information recording face is modulated by the recording pit formed on the information recording face, and the reflected light thereof is received by the unshown photo-detector in the pickup 2. The detection signal Spp is generated and outputted to the demodulating portion 3.

Then, the demodulating portion 3 performs the preset demodulation process to the detection signal Spp and generates the demodulation signal Sp, and outputs it to the system interface 9 via the switches 4 and 6.

The system interface 9 performs the preset interface process to the demodulation signal Sp, and moves it as music information Soute to the secondary receiving source. In this case, the moved distribution data is to be erased or nullified on the optical disk DK.

Next, the above-mentioned series of data recording processes by the EMD will be described by organizing its entirety according to the flowchart shown in FIG. 2.

Figure 2:
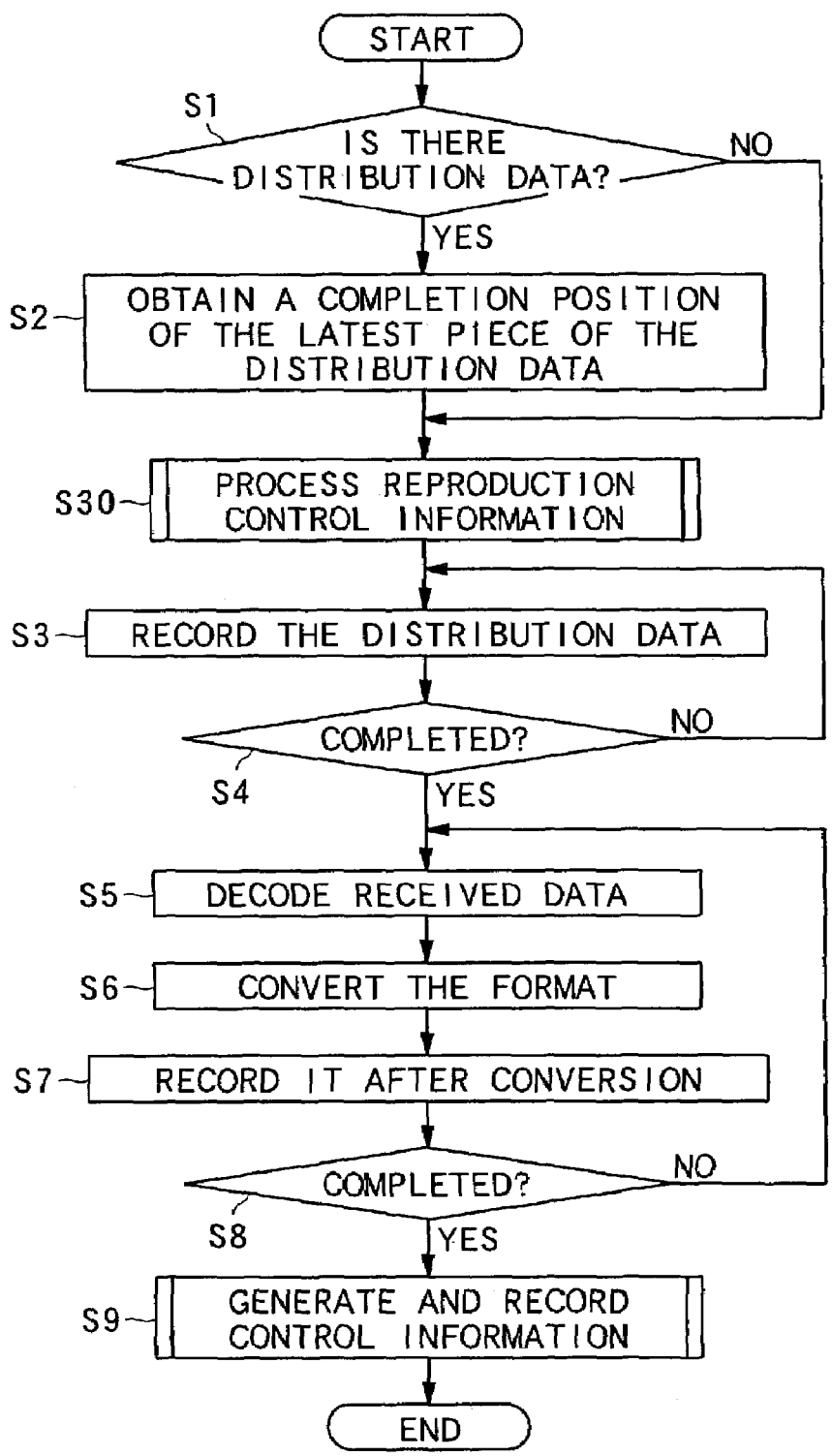
FIG. 2 is a flowchart showing a data recording process.
Figure 3:
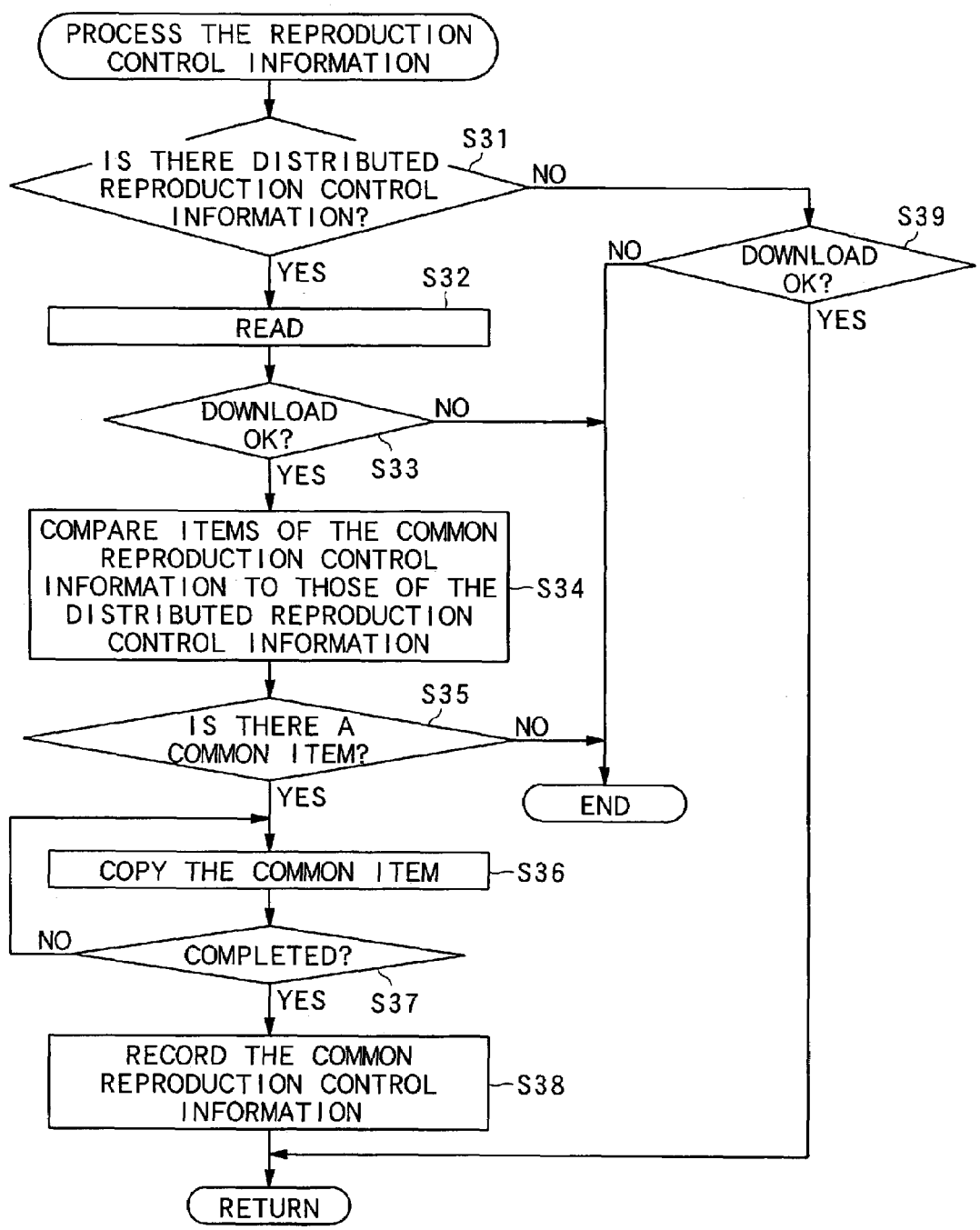
FIG. 3 is a flowchart showing the process related to reproduction control information of the first embodiment.
Figure 4:
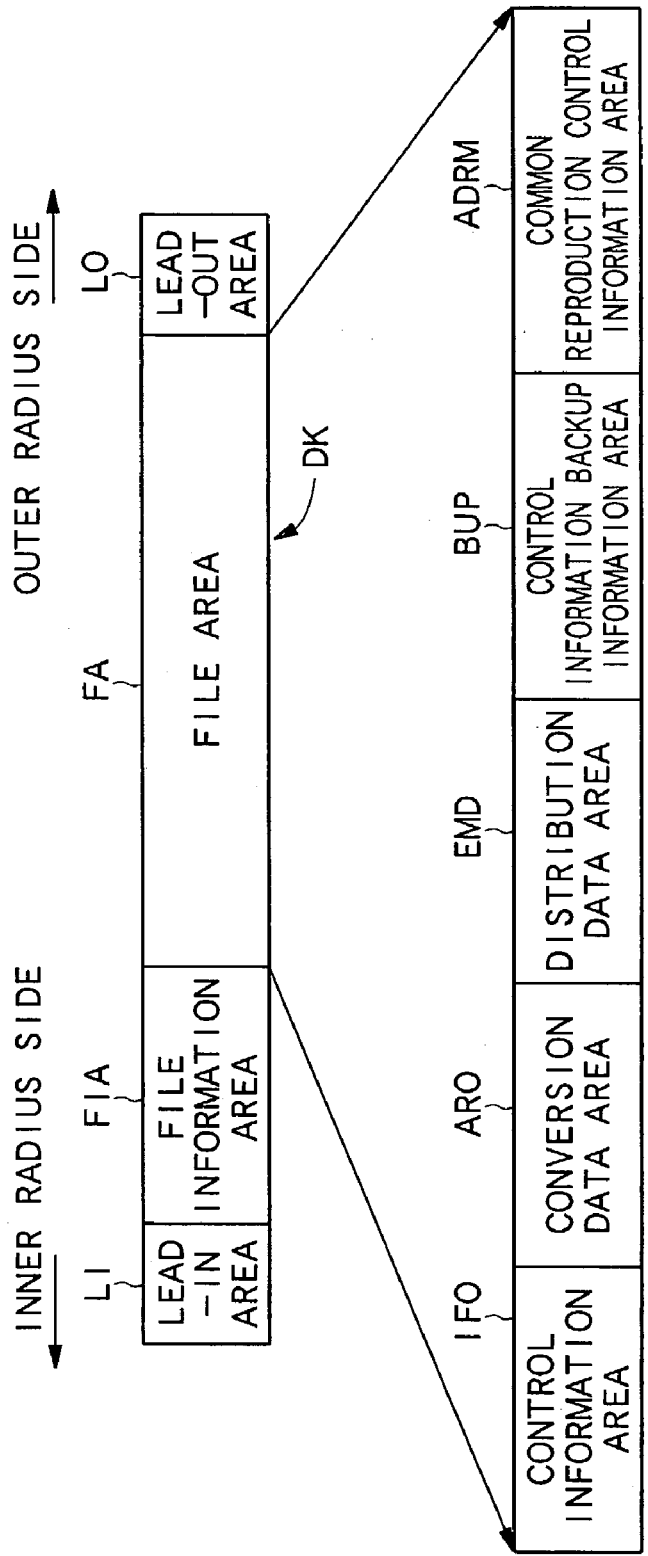
FIG. 4 is a diagram showing a physical format on an optical disk.
Figure 5:
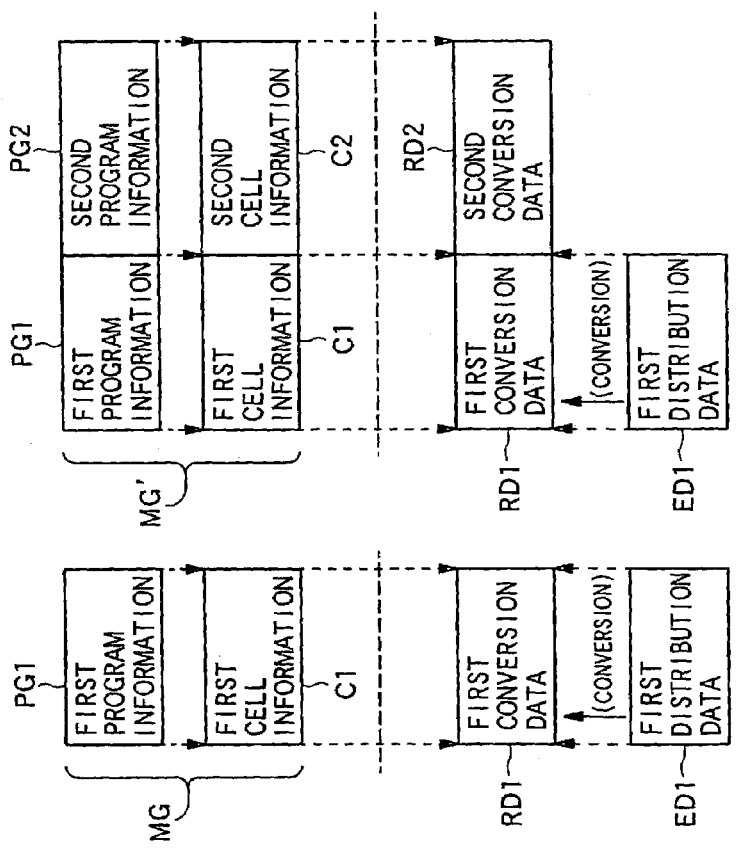
FIG. 5A is a diagram illustrating an idea of the data recording process (No. 1)
FIG. 5B is a diagram illustrating an idea of the data recording process (No. 2)
FIG. 5C is a diagram illustrating an idea of the data recording process (No. 3)
Figure 6:
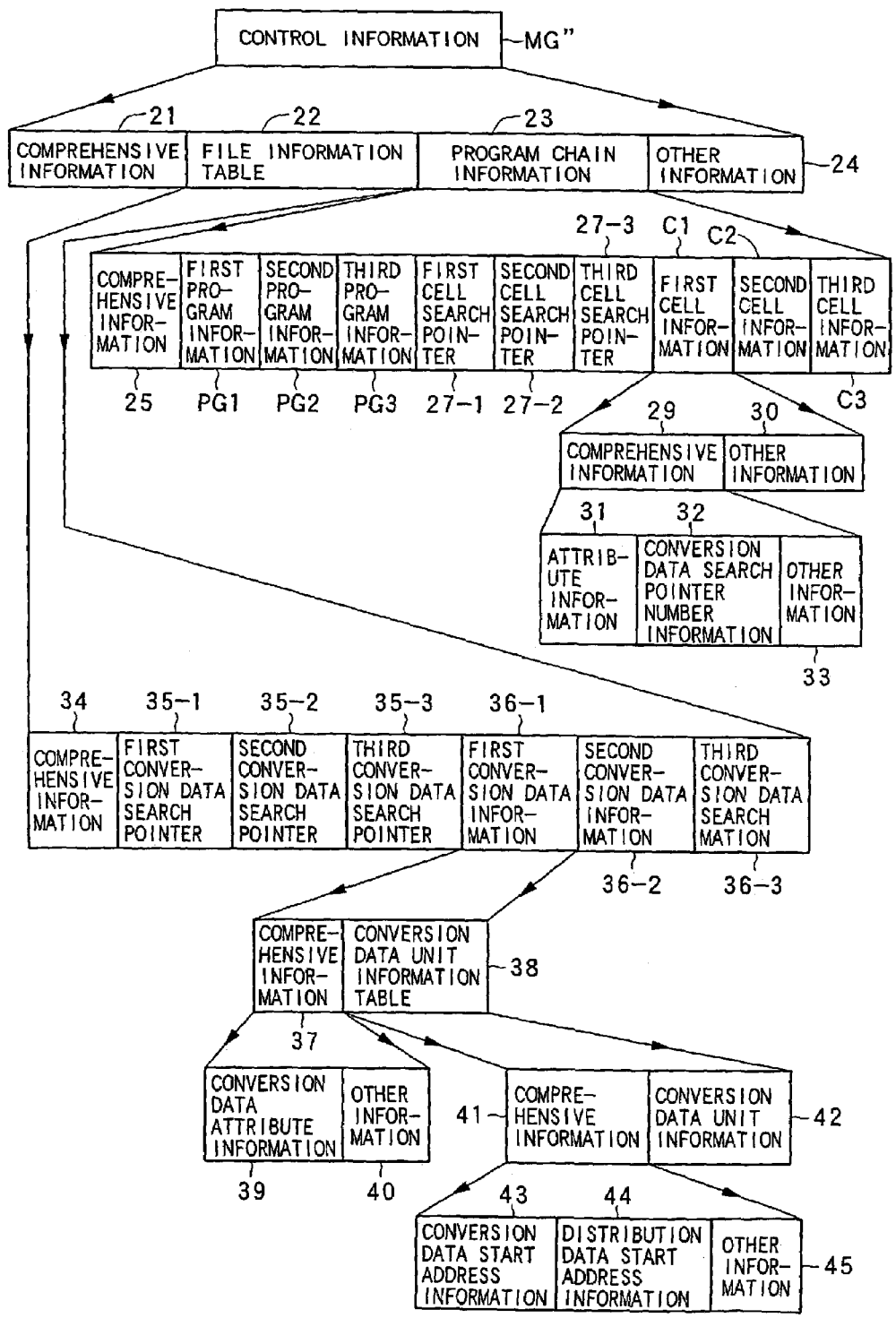
FIG. 6 is a diagram showing a configuration of control information.
Figure 7:
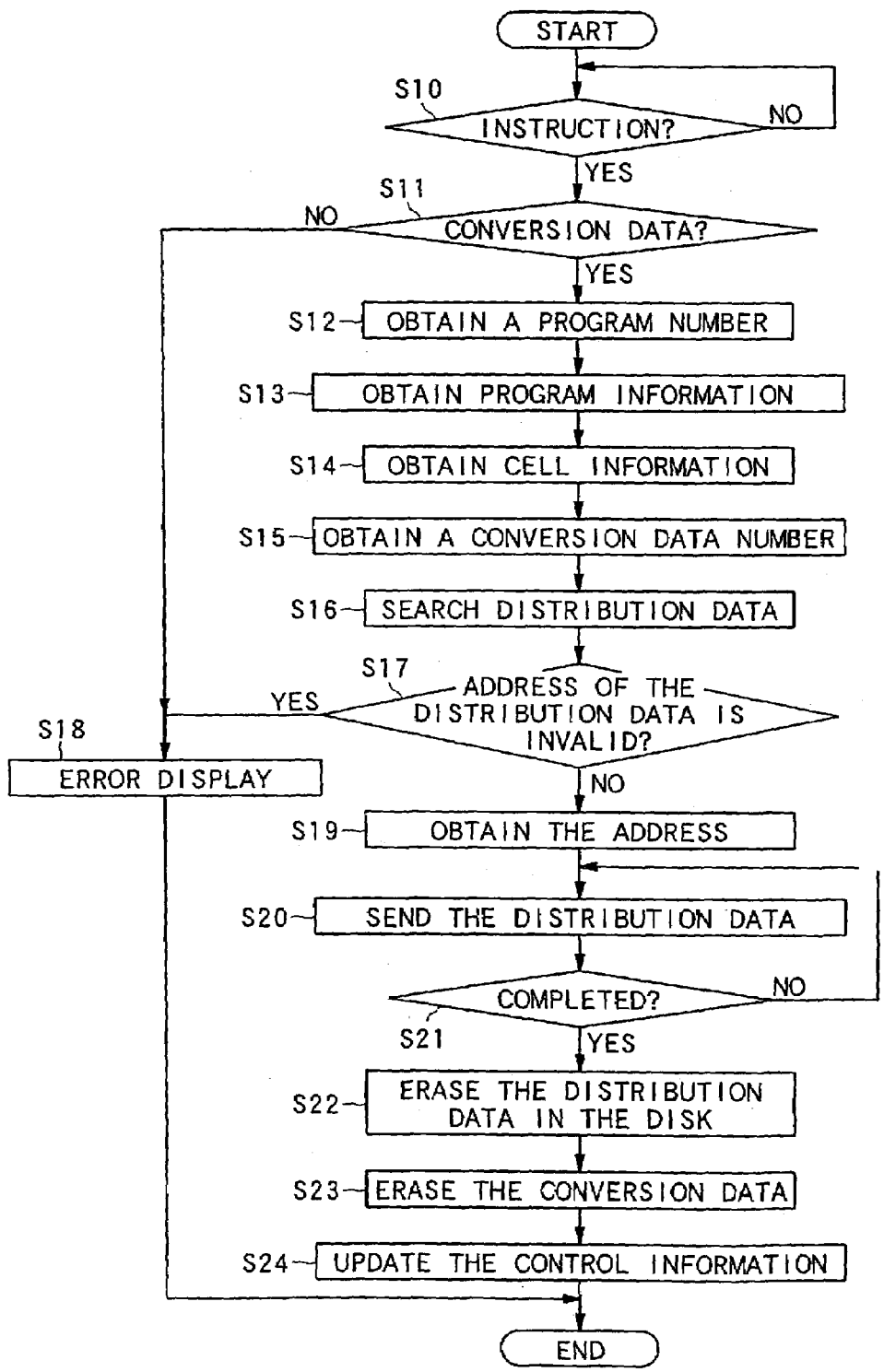
FIG. 7 is a flowchart showing a data moving process.

FIG. 2 is a flowchart showing the data recording process implemented by the information recording and reproducing apparatus, FIG. 3 is a flowchart showing details of the data recording process, FIG. 4 is a diagram showing a physical format on the optical disk after the data recording process of the first embodiment is implemented, FIG. 5 is a diagram illustrating an idea of the data recording process, FIG. 6 is a diagram showing the configuration (hierarchy) of the control information mentioned later, and FIG. 7 is a flowchart showing a data moving process implemented by the information recording and reproducing apparatus.

As shown in FIG. 2, in the data recording processes, it is first checked whether or not the music information obtained by the EMD in the past is recorded in the as-is form as the distribution data on the optical disk DK (step S1), and if the distribution data does not exist (step S1; NO), it moves on as-is to the process in a step S3. On the other hand, if the distribution data distributed in the past has already been recorded (step S1; YES), a recording completion position on the optical disk DK is obtained as to the latest piece of the distribution data distributed in the past (step S2).

Next, as mentioned above, it receives the music information and the corresponding copyright information and so on from the distribution server, and prior to the process of recording the received music information on the optical disk DK, it checks the contents of the reproduction control information included in the copyright information distributed together with the music information and records it on the optical disk DK (step S30). Moreover, the details of the step S30 will be mentioned later.

If the process related to the reproduction control information is completed, then the received music information is recorded by the above-mentioned series of data recording processes from the head of a recording area of the optical disk DK (in the case of the above step S1; NO) or the position immediately following the recording completion position of the latest piece of the distribution data in the past (in the case of going through the above step S2) (step S3). The area in which the distribution data is recorded is hereafter referred to as a distribution data area. In addition, the reproduction control information is recorded in an area separate from the distribution data area on the optical disk DK.

While recording the distribution data, it is constantly monitored whether or not it is completed (step S4). If not completed (step S4; NO), it returns to the process in the step S3 to continue the receiving and recording processes. If completed (step S4; YES), the distribution data once recorded is read again to be decoded by the decoder 10 next (step S5), and its recording format is further converted to the linear PCM method for instance (step S6). The music information after the conversion is recorded as conversion data in a conversion data area ARO on the optical disk DK mentioned later (step S7). In this case, of the control information, the information to be superposed in the conversion data and recorded is recorded concurrently with the recording of the conversion data.

While recording the conversion data, it is constantly monitored whether or not it is completed (step S8). If not completed (step S8; NO), it returns to the process in the step S5 to continue the decoding and converting processes. If completed (step S8; YES), of the control information, the information to be recorded separately from the conversion data (including the recording completion position obtained by the process in the above step S2) is recorded in a format mentioned later to correspond to the contents of the recorded conversion data (step S9) so as to finish the series of data recording processes.

Next, the process related to the reproduction control information in the step S30 will be described concretely by using FIG. 3.

As shown in FIG. 3, in the contents check and recording processes of the reproduction control information, it is first checked whether or not the distributed distribution data is accompanied by the reproduction control information to be used on the reproduction thereof (step S31). If not accompanied (step S31; NO), it is checked, based on the copyright information and so on other than the reproduction control information, whether or not it is permitted to record the distribution data on the optical disk DK (hereafter, referred to merely as a download process) (step S39). If the download process is not permitted as to the music information (step S39; NO), the download process is not permitted as to the copyright information and so on and the music information itself, and so the data recording process shown in FIG. 2 is finished as-is.

In the determination in the step S39, if the music information is permitted to be moved (step S39; YES), it moves on as-is to the process in the above step S3 in FIG. 2 regarding it as reproducible after the download process with no limitation of reproduction imposed.

On the other hand, in the determination in the above step S31, if the reproduction control information is distributed together with the music information (step S31; YES), then the distributed reproduction control information (hereafter, the reproduction control information in a distributed state is referred to as distributed reproduction control information) is read into the system controller 8 (step S32), and furthermore, the contents thereof are checked to see whether or not the download process is permitted as to the distribution data being received (step S33). If the download process is not permitted as to the music information (step S33; NO), the download process is not possible as to the distributed reproduction control information and the music information itself, and so the data recording process shown in FIG. 2 is finished as-is.

On the other hand, in the determination in the step S33, if the download process is permitted as to the music information (step S33; YES), it then compares item names of the items for the reproduction control preset to be included in the common reproduction control information mentioned later to item names of the items for the reproduction control included in the distributed reproduction control information (step S34) so as to check whether or not there is a mutually common item between them (step S35).

Here, the common reproduction control information refers to the reproduction control information which includes only the items included in common as to all of a plurality of different kinds of distributed reproduction control information to which a plurality of different kinds of distribution data should be corresponding respectively and is used for the reproduction control instead of each piece of the distributed reproduction control information when reproducing the music information (the music information recorded as the conversion data) to which each piece of the distributed reproduction control information should be corresponding. In this case, the common reproduction control information of which items (item names) as the common reproduction control information are mutually common and contents as the common reproduction control information are corresponding to the contents of the reproduction control of the music information to which it is applicable is associated one by one with each piece of the music information.

In the determination in the step S35, if the item names of the items as the common reproduction control information do not match at all with those of the items as the distributed reproduction control information (step S35; NO), it determines that the reproduction control information to be used when reproducing the distribution data recorded as the conversion data on the optical disk DK cannot be generated, and finishes the data recording process shown in FIG. 2 in order to protect the copyright on the corresponding music information.

In the determination in the step S35, if there is a mutually common item (step S35; YES), then the contents of the mutually common item are copied from the distributed reproduction control information to the common reproduction control information (step S36).

While copying the contents of the common item, it is constantly monitored whether or not it is completed (step S37). If not completed (step S37; NO), it returns to the process in the step S36 to continue the copying process. If completed (step S37; YES), then only the common reproduction control information having the copied contents is encrypted by a preset encryption method and recorded in a common reproduction control information area mentioned later on the optical disk DK (step S38), and it moves on to the process in the step S3 in FIG. 2.

(D) Embodiment of the Recording Format

Next, a description will be given as to the recording format used when recording the distribution data and conversion data by the operation described by using FIGS. 1 to 3.

First, the physical format showing physical data structure on the optical disk DK will be described by using FIGS. 4 and 5.

As shown in the upper diagram in FIG. 4, the optical disk DK having the conversion data and distribution data recorded thereon has a formation therein of, from its inner radius side, a lead-in area LI having the control information (including the address information indicating the head of the area on the optical disk DK having the music information recorded therein and so on) to be read when starting reproduction of the music information recorded on the optical disk DK, a file information area FIA having file information indicating the hierarchy of the music information recorded as the distribution data and conversion data and so on, a file area FA having the distribution data and conversion data actually recorded therein, and a lead-out area LO having the control information (including the address information indicating the end of the area on the optical disk DK having the music information recorded therein and so on) to be read when finishing the reproduction of the music information recorded therein.

The file area FA has a formation therein of a control information area IFO having the control information (except the control information included and recorded in the conversion data) stored therein, the conversion data area ARO having the conversion data recorded therein together with the control information included in the conversion data, a distribution data area EMD having only the distribution data stored therein, a control information backup information area BUP having the same control information as the control information stored in the above control information area IFO as so-called backup (preliminary) information, and a common reproduction control information area ADRM having the generated common reproduction control information recorded therein after being encrypted.

Here, in the conversion data area ARO, a piece of music information is comprised of one program or a plurality of programs and recorded, and furthermore, one program is comprised of one cell or a plurality of cells and recorded as mentioned above.

Next, change in the recording aspect of the data recorded in each area shown in FIG. 4 will be described while illustrating it by using FIG. 5. FIG. 5 illustrates the case where a piece of conversion data and the distribution data corresponding thereto are recorded together with corresponding control information first, and then the music information from the external sound source other than the distribution server is recorded as the conversion data by the linear PCM method together with the corresponding control information. Thereafter, it further illustrates the case where other conversion data and the distribution data corresponding thereto are recorded together with corresponding control information again. Here, each piece of conversion data is comprised of one program comprised of one cell respectively.

First, immediately after a piece of conversion data and the distribution data corresponding thereto are recorded together with the corresponding control information, as shown in FIG. 5A, first distribution data ED1 is stored as the one piece of distribution data in the distribution data area EMD on the optical disk DK, and furthermore, first conversion data RD1 obtained by converting it is stored as the above one piece of conversion data in the conversion data area ARO.

Control information MG as the control information corresponding to this is recorded by having the hierarchy mutually formed by first program information PG1 indicating the number of the cells included in one program constituting the first conversion data RD1 and first cell information C1 including the address information (indicating an offset logical address from the head of the conversion data area ARO, and the same hereafter) indicating a recording start position on the optical disk DK of one cell constituting the one program.

Next, immediately after the music information outputted from an external CD (Compact Disc) reproducing apparatus for instance is recorded as-is by the linear PCM method together with the corresponding control information after the first distribution data ED1 and the first conversion data RD1 are recorded, second conversion data RD2 equivalent to the music information is stored in the conversion data area ARO as shown in FIG. 5B. The second conversion data RD2 in this case is substantially the music information inputted from the external CD reproducing apparatus or the like recorded as-is by the linear PCM method.

Control information MG' as the control information corresponding to this is recorded by having the hierarchy mutually formed by second program information PG2 indicating the number of the cells included in one program constituting the second conversion data RD2 and second cell information C2 including the address information indicating the recording start position on the optical disk DK of one cell constituting the one program.

Lastly, immediately after the other conversion data and the distribution data corresponding thereto are recorded again together with the corresponding control information after the second conversion data RD2 is recorded, as shown in FIG. 5C, second distribution data ED2 is stored as the other distribution data in the distribution data area EMD on the optical disk DK, and furthermore, third conversion data RD3 obtained by converting it is stored as the above other conversion data in the conversion data area ARO.

Control information MG" as the control information corresponding to this is recorded by having the hierarchy mutually formed by third program information PG3 indicating the number of the cells included in one program constituting the third conversion data RD3 and third cell information C3 including the address information indicating the recording start position on the optical disk DK of one cell constituting the one program and so on.

In the example described by using FIG. 5, the address information of the conversion data in the conversion data area ARO is "00000000h (h indicates a hexadecimal, and the same hereafter)," "11111111h" and "22222222h" in order from the first conversion data RD1 for instance. Furthermore, the address information of the distribution data in the distribution data area EMD (in this case, the offset logical address from the head of the distribution data area EMD) is "00000000h" and "00001111h" in order from the first distribution data ED1 for instance.

Next, the logical format in the control information will be described in further detail by using FIG. 6 and taking the control information MG" in FIG. 5C as an example.

The control information MG" including the control information corresponding to the first conversion data RD1 to the third conversion data RD3 respectively is comprised of comprehensive information 21, a file information table 22, program chain information 23, and other information 24 required for the control information MG" as shown in FIG. 6.

In this case, the comprehensive information 21 includes the information on the entire optical disk DK having up to the third conversion data RD3 recorded thereon, to be more specific, the numbers of pieces of conversion data and the distribution data recorded at that time respectively, the start positions on the optical disk DK of the conversion data area ARO and the distribution data area EMD respectively and so on.

Next, as mentioned later, the file information table 22 includes an attribute of the conversion data (that is, whether or not it is the conversion data converted from the distribution data) and the recording start position on the optical disk DK of the conversion data.

Furthermore, the program chain information 23 includes the above program information and cell information.

Next, the program chain information 23 will be described more concretely.

As shown in FIG. 6, the program chain information 23 in the control information MG" includes comprehensive information 25, the above first program information PG1 to third program information PG3, a first cell search pointer 27-1 to a third cell search pointer 27-3 indicating the positions on the optical disk DK at which the first cell information C1 to third cell information C3 are recorded respectively, and the above first cell information C1 to third cell information C3.

A piece of cell information (the first cell information C1 for instance) is comprised of comprehensive information 29 and other information 30 which is the other information required for the cell information.

The comprehensive information 29 includes attribute information 31 indicating the attribute of the conversion data including the cell corresponding to the comprehensive information 29, conversion data search pointer number information 32 which is the number of the conversion data search pointer mentioned later corresponding to the conversion data including the cell corresponding to the cell information including the comprehensive information 29, and other information 33 which is the other information required for the comprehensive information 29.

Here, the conversion data search pointer number information 32 is included in the comprehensive information 29, and so it is possible to associate the cell information including the comprehensive information 29 with the conversion data.

The attribute information 31 indicates whether or not the conversion data including the cell is the conversion data converted from the distribution data by the contents of the highest order bit thereof, and further indicates whether or not the cell is the cell as the music information according to the contents of the 2 low order bits thereof.

To be more specific, if the highest order bit of the attribute information 31 is "1" for instance, it indicates that the conversion data including the cell is the data converted from the distribution data, and if the highest order bit is "0", it indicates that the conversion data including the cell is not the data converted from the distribution data, that is, to be more specific, it is the music information of the linear PCM method reproduced by the CD reproducing apparatus, for instance. Furthermore, if the 2 low order bits of the attribute information 31 is "10," it indicates that the cell is the cell as the music information.

Next, the file information table 22 will be described more concretely.

The file information table 22 includes comprehensive information 34 including the conversion data information mentioned later and the information indicating the numbers of the conversion data search pointers respectively and so on, first conversion data information 36-1 including the recording position information and so on, on the first conversion data RD1, second conversion data information 36-2 including recording position information and so on, on the second conversion data RD2, third conversion data information 36-3 including recording position information and so on, on the third conversion data RD3, and a first conversion data search pointer 35-1 to a third conversion data search pointer 35-3 indicating the positions on the optical disk DK at which the first conversion data information 36-1 to third conversion data information 36-3 are recorded respectively.

Each piece of the conversion data information includes comprehensive information 37 and a conversion data unit information table 38.

The comprehensive information 37 includes therein conversion data attribute information (having the same contents as those of the above corresponding attribute information 31) 39 indicating the attribute of the corresponding conversion data and other information 40 which is the other information required for the comprehensive information 37.

Furthermore, the conversion data unit information table 38 includes therein comprehensive information 41 and conversion data unit information 42 indicating an amount of information as to each piece of information constituting the corresponding conversion data.

The comprehensive information 41 includes conversion data start address information 43 which is the address information in the conversion data area ARO of the corresponding conversion data, distribution data start address information 44 which is the address information in the distribution data area EMD of the distribution data being a conversion source of the conversion data, and other information 45 which is the other information required for the comprehensive information 41.

Here, the contents of the above distribution data start address information 44 will be described further in detail. When the corresponding conversion data is the data obtained by converting the distribution data (that is, when the highest order bit of the attribute information 31 is "1" in the above example), the distribution data start address information 44 has the address information corresponding to the distribution data which is the conversion source thereof described therein as mentioned above. When the corresponding conversion data is not the data obtained by converting the distribution data (that is, when the highest order bit of the attribute information 31 is "0" in the above example), the distribution data which is the conversion source does not exist in the first place, and so the information which is originally invalid as the distribution data start address information 44 ("FFFFFFFFh" for instance) is described.

In a step S9 in the data recording process shown in the above FIG. 2, the distribution data start address information 44 generated in a state where the distribution data already exists (FIG. 2 step S1; YES) has end position information on the latest piece of the past distribution data obtained in the process of the step S2 in the FIG. 2 described therein.

(E) Embodiment of the Data Moving Process

Lastly, a series of data moving processes (that is, the instance of the move in the case of the above mentioned check out) conforming to the SDMI specifications performed centering on the system controller 8 will be described by using the flowchart in FIG. 7.

As shown in FIG. 7, in the data moving process in the embodiment, the system controller 8 checks whether or not the operation for performing the data moving process was implemented by an operating portion not shown in FIG. 1 (step S10). If not implemented (step S10; NO), it stands by until the process is implemented, and if implemented (step S10; YES), it then checks the attribute information 31 corresponding to the data to be moved and thereby determines whether or not the cell to which the attribute information 31 is corresponding (in other words, the corresponding conversion data including that cell) is the cell (conversion data) obtained by converting the distribution data (step S11). If the cell is not the cell (conversion data) obtained by converting the distribution data (step S11; NO), it is impossible to perform the data moving process shown in FIG. 7 because no corresponding distribution data exists, so that an error display to that effect is performed on a display not shown (step S18) so as to finish the data moving process itself. If the cell is the cell (conversion data) obtained by converting the distribution data (step S11; YES), it then obtains a program number indicating the program to be moved (step S12), and further obtains corresponding program information PG by using the program number as a clue (step S13), further obtains corresponding cell information C by using the program information PG as a clue (step S14), obtains the number of the conversion data which the cell belongs to according to the contents of the conversion data search pointer number information 32 (see FIG. 6) included in the comprehensive information 29 in the cell information C (step S15), and further obtains the distribution data start address information 44 of the distribution data described in the conversion data information corresponding to the conversion data of the obtained number (step S16).

It determines whether or not the contents of the obtained distribution data start address information 44 are "FFFFFFFFh" (step S17). If the contents thereof are "FFFFFFFFh," that is, an invalid value (step S17; YES), it is impossible to perform the data moving process shown in FIG. 7 because no corresponding distribution data exists, so that it undergoes the above-mentioned error process in the step S18 so as to finish the data moving process itself.

In the determination in the step S16, if the contents of the distribution data start address information 44 are a value other than "FFFFFFFFh," that is, valid address information (step S17; NO), it then obtains that address information (step S19), and reads the distribution data recorded in the distribution data area EMD headed by the address indicated by the obtained address information together with the corresponding copyright information and so on (the copyright information and so on including the reproduction control information of which contents are those included only in the items for the reproduction control recorded as the common reproduction control information in the common reproduction control information area ADRM) and moves them as the music information Soute to the secondary receiving source (step S20).

It checks whether or not the moving process of the distribution data accompanied by the corresponding copyright information and so on was completed (step S21), and if not completed (step S21; NO), it continues the process. If completed (step S21; YES), it erases or nullifies the distribution data to be moved in the optical disk DK (step S22), and further erases or nullifies the conversion data recorded in the conversion data area ARO by converting the distribution data to be moved (step S23), and updates the contents of the control information corresponding to the erased distribution data and conversion data (step S24) so as to finish a series of the data moving processes.

(F) Embodiment of the Reproduction Process

Lastly, the reproduction process of the music information from the optical disk DK performed centering on the system controller 8 will be described by using the flowchart shown in FIG. 8. As mentioned above, the conversion data obtained by converting the distribution data and the distribution data itself are recorded together on the optical disk DK, but only the conversion data is to be reproduced by the following information recording and reproducing apparatus S.

Figure 8:
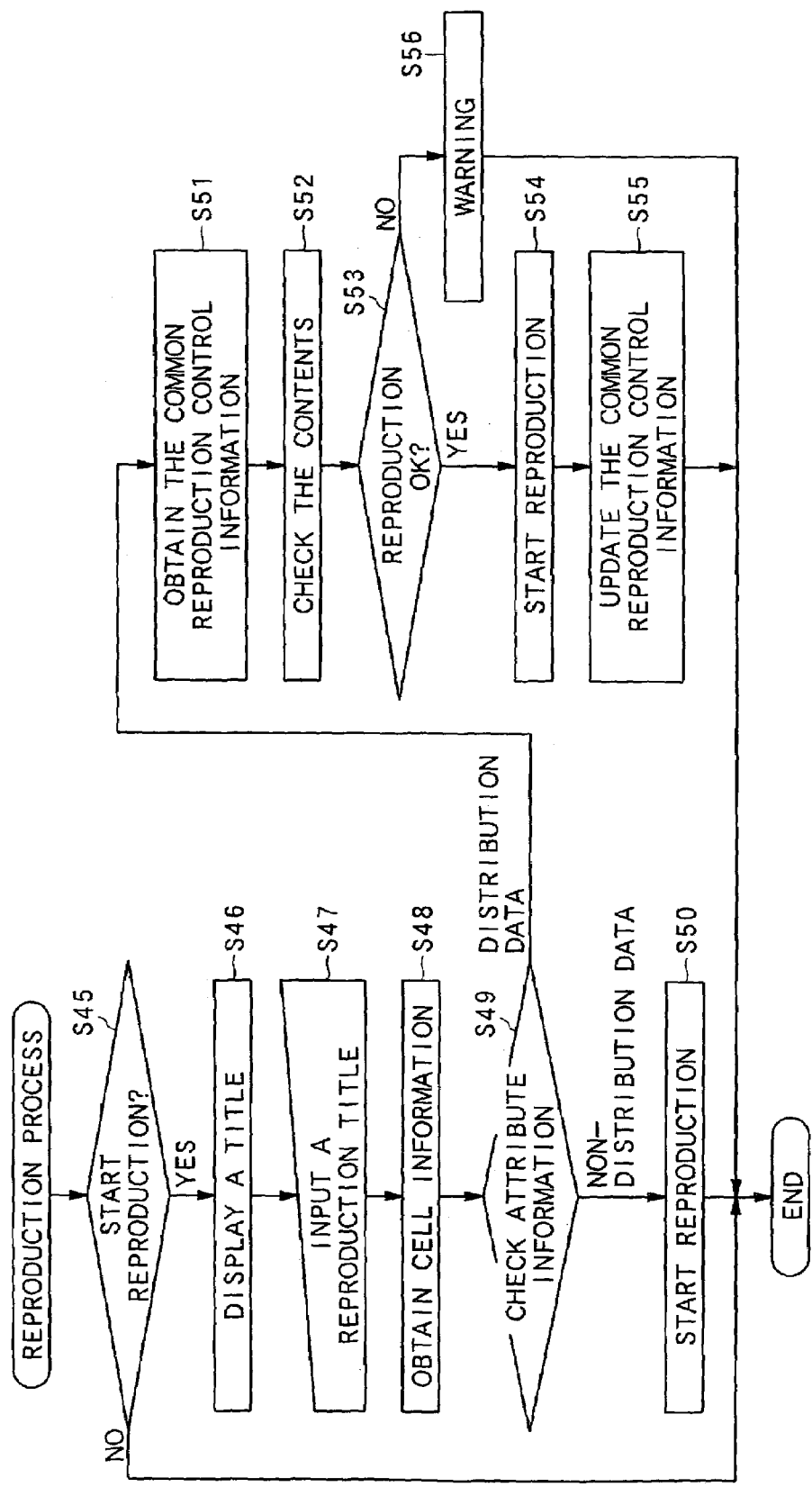
FIG. 8 is a flowchart showing a reproducing process in a first embodiment.

As shown in FIG. 8, in the reproduction process of the first embodiment, it is checked by the system controller 8 whether or not the operation for implementing the reproduction process was implemented in an operating portion not shown in FIG. 1 (step S45). If not implemented (step S45; NO), it stands by until the operation is implemented, and if implemented (step S45; YES), it then displays titles indicating the music information recorded in a reproducible state on the optical disk DK in a display portion not shown in FIG. 1 respectively (step S46). Furthermore, if the title to be reproduced is selected and inputted in the operating portion based on the displayed titles (step S47), it searches for and obtains cell information C (refer to FIG. 6) constituting the music information (the music information as the conversion data) corresponding to the selected title in the optical disk DK (step S48), and checks the contents of attribute information 31 in the obtained cell information C (step S49).

If the contents of the attribute information 31 are those indicating that the conversion data including the corresponding cell is not the conversion data converted from the distribution data (step S49; non-distributed data), the conversion data requires no limitation of reproduction and so the conversion data is reproduced as-is (step S50) so as to finish the reproduction process of the first embodiment.

In the determination in the step S49, if the contents of the attribute information 31 are those indicating that the conversion data including the corresponding cell is the conversion data converted from the distribution data (step S49; distributed data), it then reads the common reproduction control information corresponding to the music information to be reproduced recorded in the common reproduction control information area ADRM (step S51) and the contents thereof are checked by the system controller 8 (step S52).

It determines whether or not the music information selected based on the checked contents is reproducible (step S53). If not reproducible (step S53; NO), it gives a warning that it is not reproducible to a user by indicating it in the above unshown display portion (step S56) so as to finish the reproduction process of the first embodiment as-is.

In the determination in the step S53, if the selected music information is reproducible (step S53; YES), it starts the reproduction thereof (step S54), and updates the information in the common reproduction control information (to be more specific, the frequency of reproduction completed is incremented just by "1" as to the information on limitation of the frequency of reproduction in the common reproduction control information. step S55) after finishing the reproduction so as to finish the reproduction process of the first embodiment.

As described above, according to the operation of the information recording and reproducing apparatus S related to the embodiment, it records the inputted music information by converting it into the linear PCM method so that the music information can be recorded in a state capable of decoding and reproduction by a plurality of types of information reproducing apparatuses so that the compatibility in the reproduction process can be secured.

In addition, it records the attribute information 31 and the common reproduction control information together with the conversion data, and when the attribute information 31 indicates that the conversion data is recorded, it detects and uses the corresponding common reproduction control information on reproducing the conversion data. It is thereby possible to clearly distinguish the conversion data obtained by converting the distribution data from other conversion data and then reproduce the corresponding music information while performing the reproduction control based on the common reproduction control information.

Furthermore, not only the conversion data but also the original distribution data is recorded as-is in the encoding scheme on the distribution thereof, and so the distribution data can be moved as-is in the original encoding scheme when moving it to the outside.

Furthermore, the common reproduction control information is recorded together with the conversion data so that, by using the common reproduction control information when reproducing the conversion data, it is possible, even in the case of the conversion data obtained from different kinds of distribution data corresponding to different pieces of distributed control information respectively, to reproduce the conversion data without having a special configuration to correspond to each piece of the reproduction control information so as to further improve the compatibility as the information reproducing apparatus.

In addition, it deletes on the optical disk DK the distribution data and the corresponding conversion data after moving them to the secondary receiving source so that, even if an attempt is made to illegally detect the moved distribution data on the optical disk DK by a subsequent operation, the illegal operation can be rendered infeasible.

(III) Second Embodiment

Next, a second embodiment which is another embodiment related to the present invention will be described by using FIGS. 9 and 10.

Figure 9:
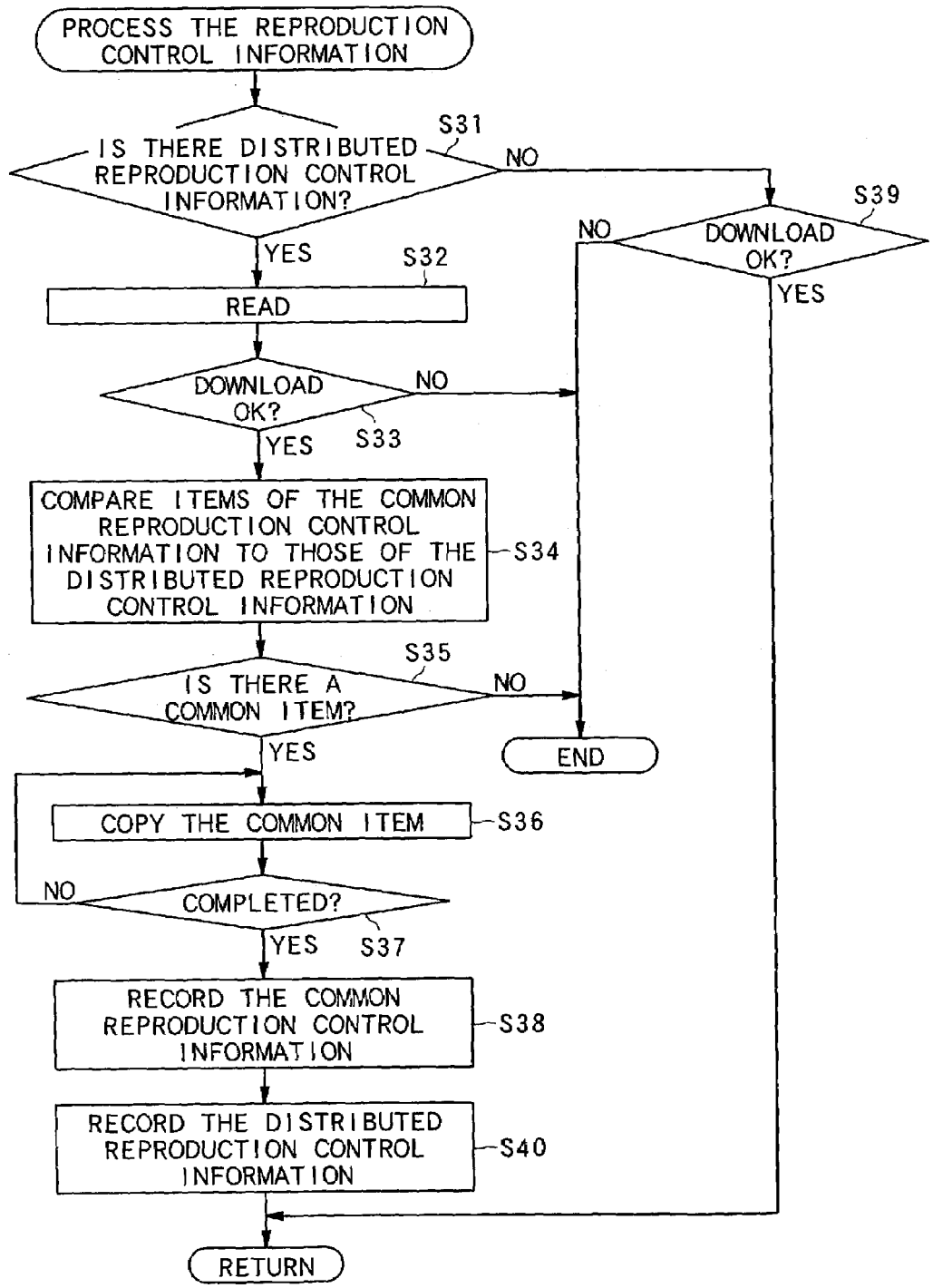
FIG. 9 is a diagram showing a physical format on an optical disk in a second embodiment.

FIG. 9 is a flowchart showing the recording process of the reproduction control information related to the second embodiment, and FIG. 10 is a diagram showing a physical format on the optical disk related to the second embodiment. In FIGS. 9 and 10, the process or member which is the same as the corresponding process (FIG. 3) or physical format (FIG. 4) of the first embodiment are given the same step number or member number, and detailed description thereof will be omitted. Furthermore, detailed description of the configuration of the information recording and reproducing apparatus used for the process of the second embodiment will be omitted since it has the same configuration as the information recording and reproducing apparatus S related to the first embodiment.

In the above-mentioned first embodiment, a description was given as to the case of recording on the optical disk DK only the common reproduction control information generated from the distributed reproduction control information (refer to FIG. 3) as the reproduction control information to be used on reproducing the music information. In the second embodiment described below, the original distributed reproduction control information is also recorded on the optical disk DK in addition to the common reproduction control information.

To be more specific, in data recording process in the information recording and reproducing apparatus of the second embodiment, the processing in the steps S1 and S2 shown in FIG. 2 is performed first.

Next, as for the processing related to the reproduction control information of the second embodiment, the processing in the steps S31 to S39 as in the case of the first embodiment (refer to FIG. 3) is performed as shown in FIG. 9. If the common reproduction control information is recorded (steps S38), the distributed reproduction control information itself which is distributed thereafter is also encrypted by the same cipher system as that of the common reproduction control information, and is recorded in a distributed reproduction control information area on the optical disk DK mentioned later (steps S40), and it moves on to the above process in the step S3 in FIG. 2.

In this case, as shown in FIG. 10, the distributed reproduction control information area DRM is formed in the file area FA together with the common reproduction control information area ADRM. Moreover, the configuration of the recording formats (including the physical format and logical format) of the second embodiment other than the above distributed reproduction control information area DRM is the same as the first embodiment, and so the detailed description thereof will be omitted.

As for the data moving process, when moving the distribution data in the above-mentioned first embodiment, the corresponding common distributed reproduction control information is moved together. In the second embodiment, the original distributed reproduction control information is moved together with the distribution data instead of the common reproduction control information.

Furthermore, when the distributed reproduction control information is recorded on the optical disk DK in the second embodiment, the reproduction control information to be used when reproducing the music information is not the distributed reproduction control information, but the common reproduction control information in the above common reproduction control information area ADRM is used as in the case of the above first embodiment.

According to the operation of the information recording and reproducing apparatus of the second embodiment described above, not only the common reproduction control information but also the distributed reproduction control information is recorded together in addition to the effects produced by the information recording and reproducing apparatus S of the above-mentioned first embodiment so that, it is possible, when moving the distribution data to the outside, to move the distributed reproduction control information corresponding to the distribution data in the as-is aspect on the distribution together with the distribution data.

Moreover, it is also possible to record programs corresponding to the flowcharts shown in the above FIGS. 2, 3, 7, 8 and 9 on a flexible disk or a hard disk or record them by distributing them via a network such as the Internet and have them read and executed by a general-purpose microcomputer so as to have the microcomputer function as the system controller 8 of the first or second embodiment.

Furthermore, the above-mentioned embodiments described the cases of recording the music information on the optical disk DK. In addition, the present invention is applicable to the cases of securing the compatibility when recording video information including the corresponding music information on the optical disk DK.

Furthermore, the present invention is also applicable to the cases of using a hard disk or a semiconductor memory as the recording medium in addition to the optical disk DK.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-5349 filed on Jan. 11, 2002 including the specification, claims, drawings and summary is incorporated herein by reference in its entirety.

What is claimed is:

1. An information recording apparatus comprising:
an encoding device which encodes record information to be recorded on a recording medium in a specific encoding scheme for allowing decode by a plurality of types of information reproducing apparatuses to generate encoded record information;
a generating device which, when the record information is distributed from an outside and includes reproduction control information for controlling reproduction aspects on reproduction of encoded distributed record information obtained by encoding the distributed record information by the encoding device, generates applicable reproduction control information for controlling the reproduction aspects on actual reproduction of the encoded distributed record information after recording it on the recording medium, based on the reproduction control information which is distributed;

a first recording device which records on the recording medium the applicable reproduction control information which is generated and the encoded distributed record information which is encoded; and a second recording device which, when the record information is the distributed record information, records on the recording medium identification information indicating that the encoded distributed record information recorded on the recording medium is the encoded distributed record information obtained by encoding the distributed record information.

2. The information recording apparatus according to claim 1, further comprising a third recording device which records on the recording medium the distributed record information in the as-is encoding scheme on the distribution.

3. The information recording apparatus according to claim 1, wherein the generating device generates as the applicable reproduction control information common reproduction control information for controlling in common each of the reproduction aspects in the encoded distributed record information obtained by encoding different kinds of the distributed record information by the encoding device respectively, based on each piece of the reproduction control information, and the first recording device records on the recording medium the common reproduction control information which is generated together with the encoded distributed record information which is encoded.

4. The information recording apparatus according to claim 3, wherein the generating device renders as the applicable reproduction control information each piece of the reproduction control information itself in addition to the common reproduction control information, and the first recording device records on the recording medium the common reproduction control information and each piece of the reproduction control information which are generated together with the encoded distributed record information which is encoded.

5. An information reproducing apparatus for reproducing at least an encoded distributed record information from a recording medium, the recording medium comprising:

an encoded record information recording area in which encoded record information is recorded, the encoded record information generated by encoding record information to be recorded on a recording medium in a specific encoding scheme for allowing decode by a plurality of types of information reproducing apparatuses;

a distributed control information recording area in which applicable reproduction control information is recorded, the applicable reproduction control information being generated, when the record information is distributed from an outside and includes reproduction control information for controlling reproduction aspects on reproduction of encoded distributed record information obtained by encoding the distributed record information in the specific encoding scheme, based on the reproduction control information which is distributed, the applicable reproduction control information being used for controlling the reproduction aspects on actual reproduction of the encoded distributed record information after recording it on the recording medium; and an identification information recording area in which identification information is recorded, the identification information indicating that the encoded distributed record information recorded on the recording medium is the encoded distributed record information obtained by encoding the distributed record information; and said information reproducing apparatus comprising:

a first detection device which detects the identification information from the recording medium;

a determination device which determines whether or not the encoded record information to be reproduced is the encoded distributed record information based on the detected identification information;

a second detection device which detects the applicable reproduction control information from the recording medium when the encoded record information to be reproduced is the encoded distributed record information; and a reproduction device which reproduces the encoded distributed record information from the recording medium while controlling the reproduction aspects based on the applicable reproduction control information which is detected.

6. The information reproducing apparatus according to claim 5, wherein:

said recording medium comprises a distributed record information recording area in which distributed record information, which is distributed and the including reproduction control information, is recorded in the as-is encoding scheme on the distribution, and said information reproducing apparatus further comprises:

a detection device which, when moving the distributed record information which is recorded to an outside, detecting from the recording medium the distributed record information to be moved;

an output device which outputs the distributed record information which is detected to the outside; and a deletion device which deletes on the recording medium the distributed record information remaining on the recording medium after the output to the outside and the encoded distributed record information corresponding thereto.

7. The information reproducing apparatus according to claim 6, wherein:

in the distributed control information recording area, common reproduction control information is recorded as applicable reproduction control information, the common reproduction control information being used for controlling in common each of the reproduction aspects in the encoded distributed record information obtained by encoding different kinds of the distributed record information, in the distributed control information recording area, each piece of the reproduction control information itself is recorded in addition to the common reproduction control information, and said information reproducing apparatus further comprises:

a detection device which, when moving the distributed record information which is recorded to an outside, detects from the recording medium the distributed record information to be moved and the reproduction control information corresponding to the distributed record information to be moved;

an output device which outputs the distributed record information and the reproduction control information which are detected to the outside; and a deletion device which deletes the distributed record information and the reproduction control information remaining on the recording medium after the output to the outside.

8. An information recording method comprising:

an encoding process of encoding record information to be recorded on a recording medium in a specific encoding scheme for allowing decode by a plurality of types of information reproducing apparatuses to generate encoded record information;

a generating process of, when the record information is distributed from an outside and including reproduction control information for controlling reproduction aspects on reproduction of encoded distributed record information obtained by encoding the distributed record information by the encoding device, generates applicable reproduction control information for controlling the reproduction aspects on actual reproduction of the encoded distributed record information after recording it on the recording medium based on the reproduction control information which is distributed;

a first recording process of recording on the recording medium the applicable reproduction control information which is generated and the encoded distributed record information which is encoded; and a second recording process of, when the record information is the distributed record information, recording on the recording medium identification information indicating that the encoded distributed record information recorded on the recording medium is the encoded distributed record information obtained by encoding the distributed record information.

9. An information reproducing method for reproducing at least an encoded distributed record information from a recording medium, the recording medium comprising:

an encoded record information recording area in which encoded record information is recorded, the encoded record information generated by encoding record information to be recorded on a recording medium in a specific encoding scheme for allowing decode by a plurality of types of information reproducing apparatuses;

a distributed control information recording area in which applicable reproduction control information is recorded, the applicable reproduction control information being generated, when the record information is distributed from an outside and including reproduction control information for controlling reproduction aspects on reproduction of encoded distributed record information obtained by encoding the distributed record information in the specific encoding scheme, based on the reproduction control information which is distributed, the applicable reproduction control information being used for controlling the reproduction aspects on actual reproduction of the encoded distributed record information after recording it on the recording medium; and an identification information recording area in which identification information is recorded, the identification information indicating that the encoded distributed record information recorded on the recording medium is the encoded distributed record information obtained by encoding the distributed record information, said information reproducing method comprising:

a first detection process of detecting the identification information from the recording medium;

a determination process of determining whether or not the encoded record information to be reproduced is the encoded distributed record information based on the detected identification information;

a second detection process of detecting the applicable reproduction control information from the recording medium when the encoded record information to be reproduced is the encoded distributed record information; and a reproduction process of reproducing the encoded distributed record information from the recording medium while controlling the reproduction aspects based on the applicable reproduction control information which is detected.

10. An information recording medium comprising:

an encoded record information recording area in which encoded record information is recorded, the encoded record information generated by encoding record information to be recorded on a recording medium in a specific encoding scheme for allowing decode by a plurality of types of information reproducing apparatuses;

a distributed control information recording area in which applicable reproduction control information is recorded, the applicable reproduction control information being generated, when the record information is distributed from an outside and including reproduction control information for controlling reproduction aspects on reproduction of encoded distributed record information obtained by encoding the distributed record information in the specific encoding scheme, based on the reproduction control information which is distributed, the applicable reproduction control information being used for controlling the reproduction aspects on actual reproduction of the encoded distributed record information after recording it on the recording medium; and an identification information recording area in which identification information is recorded, the identification information indicating that the encoded distributed record information recorded on the recording medium is the encoded distributed record information obtained by encoding the distributed record information.

11. The information recording medium according to claim 10, wherein the medium further comprises a distributed record information recording area in which distributed record information, which is distributed and the including reproduction control information, is recorded in the as-is encoding scheme on the distribution.

12. The information recording medium according to claim 10 wherein, in the distributed control information recording area, common reproduction control information is recorded as applicable reproduction control information, the common reproduction control information being used for controlling in common each of the reproduction aspects in the encoded distributed record information obtained by encoding different kinds of the distributed record information.

13. The information recording medium according to claim 12 wherein, in the distributed control information recording area, each piece of the reproduction control information itself is recorded in addition to the common reproduction control information.

* * * * *